United States Patent [19]
Ueda et al.

[11] Patent Number: 5,416,608
[45] Date of Patent: May 16, 1995

[54] IMAGE READING APPARATUS

[75] Inventors: Toshihiko Ueda, Toyokawa; Kunihiko Konoma, Aichi; Tetsuji Niikawa; Mitsutoshi Yagoto, both of Toyokawa, all of Japan

[73] Assignee: Minolta Camera Kabushiki Kaisha, Osaka, Japan

[21] Appl. No.: 907,335

[22] Filed: Jul. 1, 1992

[30] Foreign Application Priority Data

Jul. 4, 1991 [JP] Japan .................. 3-189461

[51] Int. Cl.⁶ ............................ H04N 1/46; H01J 5/16
[52] U.S. Cl. ................... 358/474; 358/480; 358/484; 358/487; 250/227.11
[58] Field of Search ............. 358/474, 475, 480, 484, 358/487; 250/227.11; 359/604

[56] References Cited

U.S. PATENT DOCUMENTS

| | | | |
|---|---|---|---|
| 4,111,523 | 8/1976 | Kaminow | 350/96.14 |
| 4,585,298 | 8/1983 | Mori | 350/96.10 |
| 4,747,660 | 1/1987 | Nishioka | 350/96.25 |
| 4,784,877 | 3/1987 | Trumble | 427/163 |
| 4,904,035 | 8/1988 | Heckmann | |
| 4,929,045 | 9/1988 | Fuller | 350/96.15 |

FOREIGN PATENT DOCUMENTS 62-167245  10/1987  Japan .
62-237403  10/1987  Japan .

Primary Examiner—Edward L. Coles, Sr.
Assistant Examiner—John Ning
Attorney, Agent, or Firm—Willian Brinks Hofer Gilson & Lione

[57] ABSTRACT

An image reading apparatus for reading a projected image by a line sensor formed in a linear shape. An image reading apparatus has an illumination system, an original supporting member, a projection lens and a line sensor formed in a linear shape. The illumination system includes a light guide formed of a cylindrically shaped light-transmitting material, a light source for introducing light into the light guide from the lengthwise direction of the light guide, a light-diffusing portion formed on the circumference of the light guide in the lengthwise direction of the light guide and a slit portion positioned opposite the light-diffusing portion.

9 Claims, 9 Drawing Sheets

F I G. 1 7
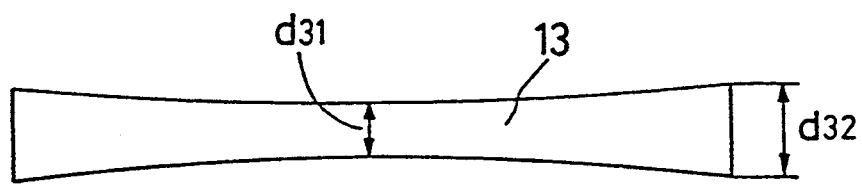
F I G. 1 8
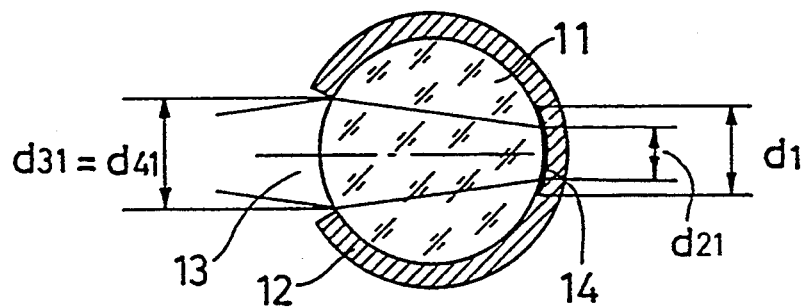
F I G. 1 9
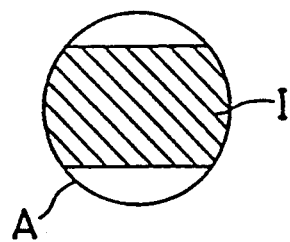

IMAGE READING APPARATUS

BACKGROUND OF THE INVENTION

1. Field of the Invention

The present invention relates to an image reading apparatus which illuminates an image recorded on film or the like via an illumination system, and uses a line sensor or the like to convert the illuminated image to electric signals which are output by the apparatus.

2. Description of the Related Art

Conventional image reading apparatus use a line sensor having a charge-coupled device (CCD) to convert an image recorded on film or the like to electric signals which are output by the apparatus, and the image reading apparatus of the aforesaid type typically have an illumination optical system for image illumination, as shown in FIG. 1. The illumination optical system of the aforesaid type is constructed so as to focus via the condensers 3 and 4 the light emitted from the xenon lamp 1 having a reflective hood 2, and project said focused light on a film surface F supported by the film holder 5. The aforesaid projected light has a two-dimensional spread. Item 6 is a projection lens and item 7 is a line sensor.

The optical system of the aforesaid type has a simple construction, but is disadvantageous in that the device is large in size. Furthermore, when the aforesaid optical system uses a line sensor as the image reading means, excessive power is unnecessarily consumed and illumination efficiency is impaired because the area outside the area being read by the line sensor is also illuminated.

Therefore, illumination optical systems having a plurality of light-emitting diodes arrayed along the line sensor, and illumination optical systems which conduct the light projected from a light source such as a xenon lamp and the like to the vicinity of a line sensor via optical fiber and the like have been proposed.

The aforesaid light-emitting diode illumination system increases construction costs because an array of a plurality of light-emitting diodes must be provided, and may cause concern of reduced resolution due to the effects of heat produced by the light-emitting diodes of the line sensor. Furthermore, the illumination system using optical fibers avoids the disadvantage of being adversely affected by the heat generated by the line sensor, but does have the disadvantages of large size and higher cost.

A conventional illumination device using a light guide LG is shown in FIGS. 2 and 3. FIG. 2 is a section view showing the light guide LG in the lengthwise direction, and FIG. 3 is a section view of the light guide LG in the Z—Z direction. This illumination device provides halogen lamp 1 having a reflective hood 2 arranged at one end of the cylindrical light guide LG. The light emitted from the halogen lamp 1 is totally reflected within the light guide LG so as to be directed in the lengthwise direction of the light guide LG and is broadened at the light-diffusing portion R, thereby forming a two-dimensional light source. The light from the aforesaid light-diffusing portion R (two-dimensional light source) is released from a slit SL provided in the surface of the light guide LG.

SUMMARY OF THE INVENTION

A main object of the present invention is to provide an image reading apparatus using an illumination system which eliminates the previously described disadvantages.

Another object of the present invention is to provide an image reading apparatus with excellent illumination efficiency via an illumination system using the previously described light guide.

A further object of the present invention is to provide an image reading apparatus using an illumination system that eliminates nonuniform illumination by analyzing the optical characteristics of the previously described light guide.

A still further object of the present invention is to provide an image reading apparatus which uses an illumination system having the previously described light guide as a transmission illumination system.

These objects of the present invention are achieved by providing an image reading apparatus comprising a light guide formed of a cylindrically shaped light-transmitting material, a light source for introducing light into said light guide from the lengthwise direction of said light guide, a light-diffusing portion formed on the circumference of said light guide in the lengthwise direction of said light guide, a slit portion positioned opposite said light-diffusing portion, an original supporting member for supporting a light-transmitting type original at a position illuminated by the luminous flux of rays emitted from the said slit portion, a projection lens for projecting the illuminated original image, and a line sensor formed in a linear shape for optically reading said projected image and outputting the read image data as electrical signals thereafter.

Furthermore, illumination efficiency can be improved by constructing the aforesaid apparatus so as to illuminate the entire area of the projection lens pupil over the width of the light-diffusing portion and the width of the slit portion.

More specifically, the width d1 of the light-diffusing portion may be set so as to fulfill the conditions described below.

$$d1 > -2 \tan \beta (1 + \cos \alpha 1) r + d4$$

where
$\beta = (\alpha 1 - \alpha 2)$
$\alpha 1 = \sin^{-1}(d4/2r)$
$\alpha 2 = \sin^{-1}\{\sin(\theta + \alpha 1)/n\}$
d1: width of light-diffusing portion
d4: width of luminous flux entering the slit portion when rays are traced from the projection lens pupil
$\theta$: angle at which luminous flux entering the slit portion meets the optical axis when rays are traced from the projection lens pupil
r: radius of light guide
n: refractive index of light guide medium The width of the light-diffusing portion or the width of the slit portion may be constructed such that the center portions and the end portions differ relative to their lengthwise directions so as to eliminate a reduction in peripheral illumination via the cosine$^4$ rule.

Furthermore, a convex cylinder lens may be arranged intermedially between the illumination system and the original to improve the luminance of the luminous flux from the light-diffusing portion.

BRIEF DESCRIPTION OF THE DRAWINGS

These and other objects or features of the present invention will become apparent from the following description of the preferred embodiments thereof taken in conjunction with the accompanying drawings, in which:

FIG. 17 is an elevation view of the slit of a third embodiment;

FIG. 18 shows the width of the light-diffusing band, width of the entering luminous flux, and width of the slit formed in the light guide of a third embodiment;

FIG. 19 shows the illumination area of the projection lens pupil of the third embodiment;

In the following description, like parts are designated by like reference numbers throughout the several drawings.

DESCRIPTION OF THE PREFERRED EMBODIMENTS

The preferred embodiments of the invention are described hereinafter.

Figure 1:
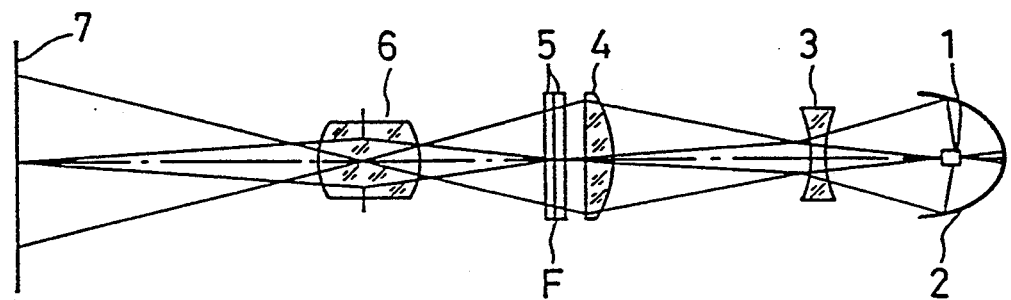
FIG. 1 is a section view showing an example of an illumination system of a conventional image reading apparatus.
Figure 2:
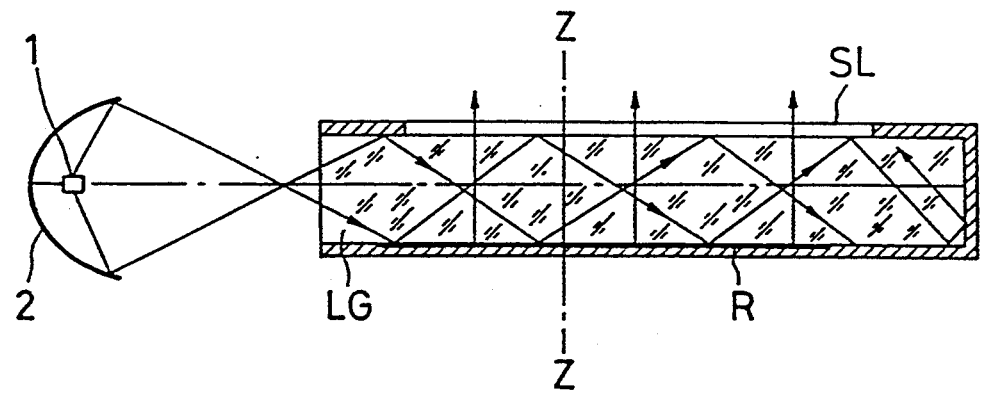
FIG. 2 is a section view showing an example of a conventional illumination system using a light guide.
Figure 3:
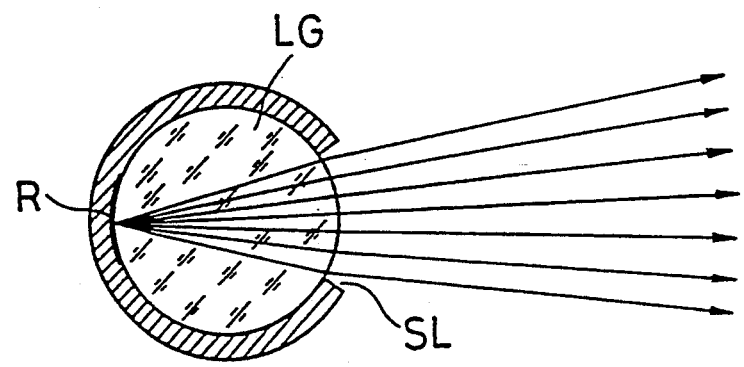
FIG. 3 is a section view showing the light guide of FIG. 2.
Figure 4:
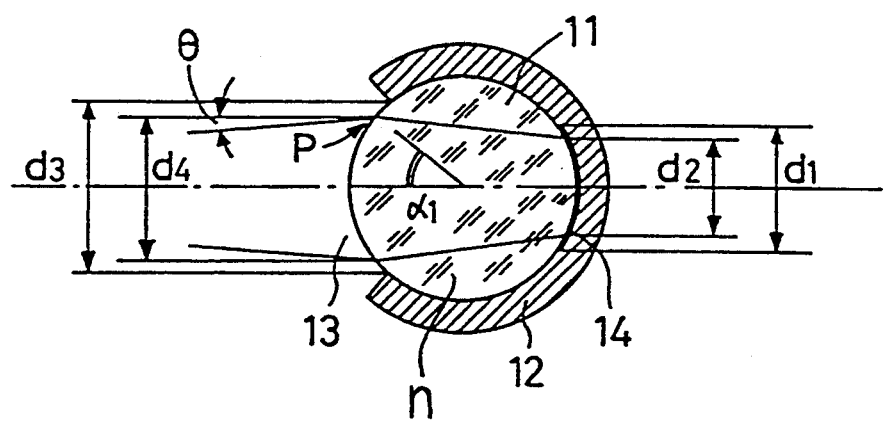
FIG. 4 is a cross section view showing an embodiment of the light guide of the present invention.
Figure 5:
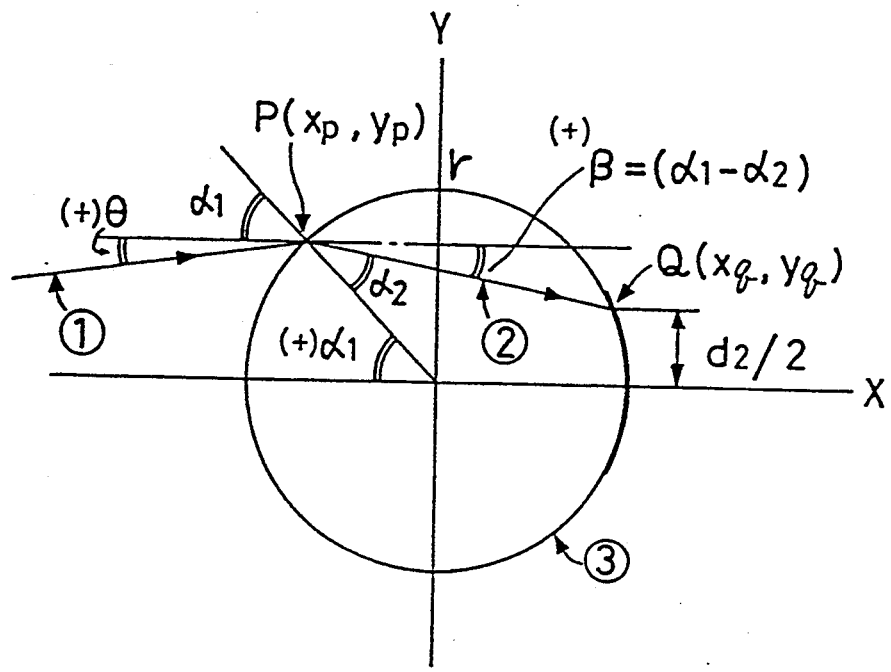
FIG. 5 is an illustration showing the rays tracing of the light entering the light guide.

FIG. 4 is an illustration in section showing the cross section construction of the light guide. In the drawing, item 1 is a cylindrical light guide formed of a light-transmitting material having a refractive index n, item 12 is a light-shielding member, item 13 is a slit, item 14 is a light-diffusing band. FIG. 5 is a ray tracing illustration which traces the light entering the light guide of FIG. 4 after refraction.

A light source is provided at one end of the light guide 11 in the axial direction. Light enters one end of the light guide and advances to the other end thereof while being totally reflected within the light guide. The entering light is diffusely reflected by the light-diffusing band 14 during the aforesaid advance in the light guide, and leaks from the slit on the side surface of the light guide so as to illuminate the film upon which is formed the original image. For convenience of calculations in analyzing the relationship between the width of the incident luminous flux entering the light guide and the width of the light-diffusing band, light enters from the side of the light guide, is diffusely reflected by the light-diffusing band 14, and is emitted from the slit 13.

Analysis of the relationship between the width of the incident luminous flux and the width of the light-diffusing band, as shown in FIGS. 4 and 5, is described below.

The reference numbers and labels described in FIGS. 4 and 5 are defined below.

- d1: width of light-diffusing band
- d2: width of luminous flux on the surface of the light-diffusing band opposite d4 and $\theta$
- d3: width of slit
- d4: width of luminous flux entering the slit when rays are traced from the projection lens pupil
- $\theta$: angle at which luminous flux entering the slit meets the optical axis when rays are traced from the projection lens pupil
- r: radius of light guide
- n: refractive index of light guide medium
- (1): incidence rays
- (2): refractive rays advancing within the light guide
- (3): outline of light guide The ray tracing relates to rays entering the light guide at an angle 8 from the optical axis at point P (Xp,Yp) (where Yp=d4/2).

The coordinate Yp of point P is expressed as:

$$Y_p = d4/2 = r \sin \alpha1 \therefore \alpha2 = \sin^{-1}(d4/2r) \quad (1)$$

Since the incidence rays are refracted at point P, the following obtain:

$$\sin(\theta+\alpha1) = n \sin \alpha2 \therefore \alpha2 = \sin^{-1}(\sin((\theta+\alpha1)/n) \quad (2)$$

and $$\beta = (\alpha1 - \alpha2) \quad (3)$$

In a coordinate system having the center of the light guide as the origin, the refractive rays of item (2) can be expressed by the following Eq. 4.

$$Y = -\tan \beta(X + r \cos \alpha1) + d4/2 \quad (4)$$

The exterior circular form of the light guide is expressed by Eq. 5.

$$X^2 + Y^2 = r^2 \quad (5)$$

When solving the Eqs. 4 and 5, the coordinates (Xq,Yq) of point Q are pertinent insofar as the range of the solution is X>0. In the small range wherein d2/2 is compared with r, Xq is equal to r, such that via Eq. 4 the width of luminous flux d2 on the surface of the light-diffusing band may be expressed as follows:

$$d2 = 2Yq = -2 \tan \beta (1 + \cos \alpha 1)r + d4 \quad (6)$$

Figure 6:
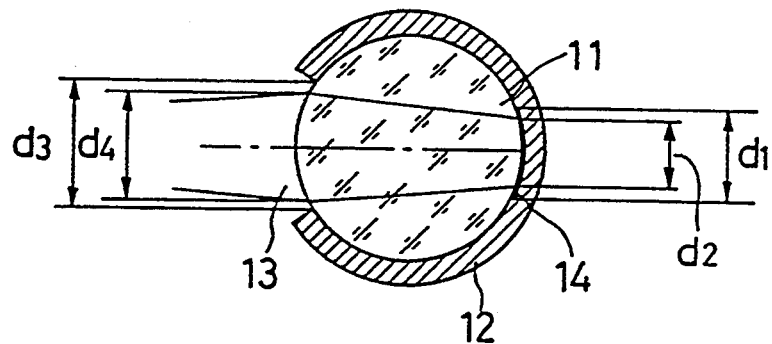
FIG. 6 is an illustration showing the width of the light-diffusing band, width of the entering luminous flux, and width of the slit formed in the light guide.
Figure 7:
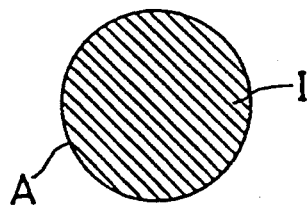
FIG. 7 is an illustration of the illumination region of the projection lens pupil.

Accordingly, if the slit width d3 of the is set so as to be greater than the incidence light width d4 (d3>d4) and the light-diffusing band width d1 is set so as to be greater than the luminous flux width d2 on the surface of the light-diffusing band (d1>d2), as shown in FIG. 6, the illumination area I of the projection lens pupil A may include the total area of the pupil, as shown in FIG. 7.

Figure 8:
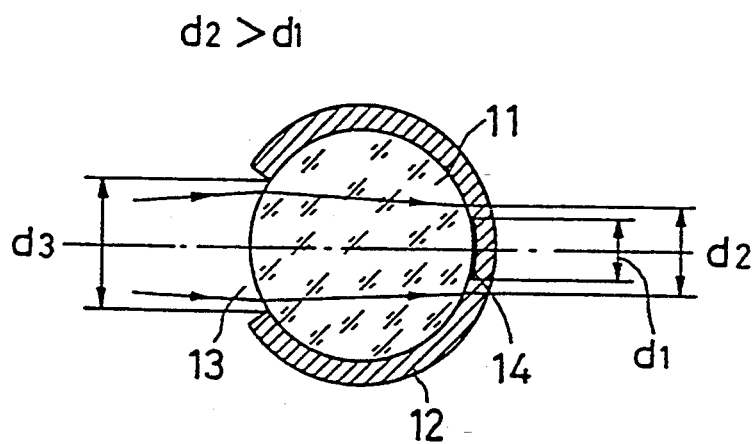
FIG. 8 is an illustration showing the width of the light-diffusing band, width of the entering luminous flux, and width of the slit formed in the light guide.
Figure 9:
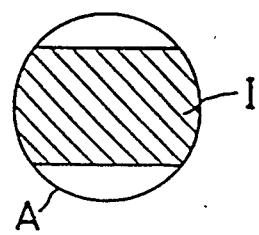
FIG. 9 shows the illumination region of the projection lens pupil.

As shown in FIG. 8, when the light-diffusing band width d1 is set smaller than the luminous flux d2 on the surface of the light-diffusing band (d1>d2), an eclipse is produced at one end and an opposite end of the illumination area I of the projection lens pupil A such that the total area of the pupil cannot be illuminated.

Figure 10:
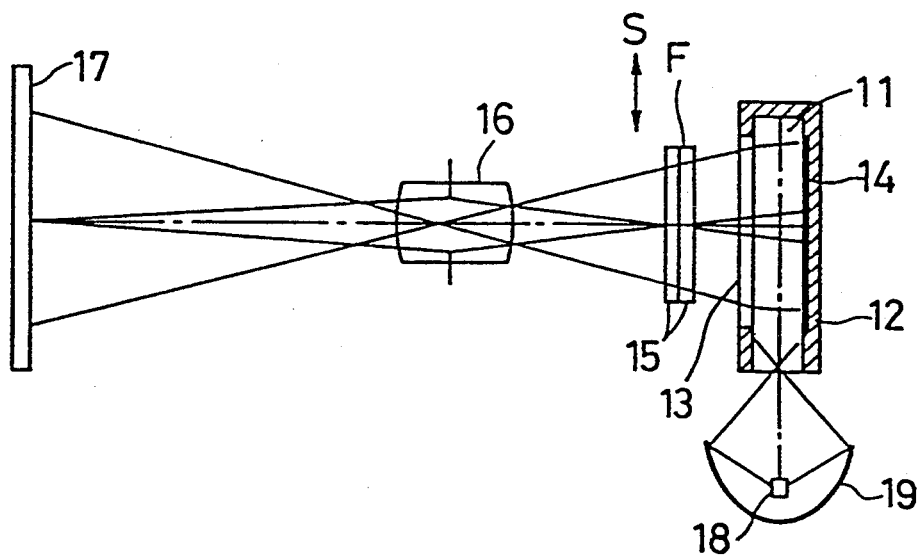
FIG. 10 is a section view showing the main scan direction of the optical system of the first embodiment.
Figure 11:
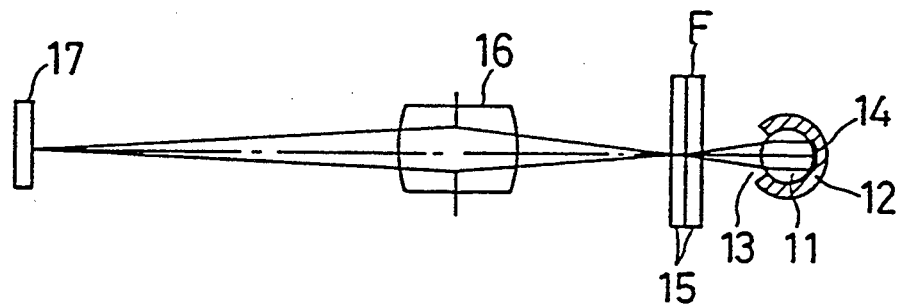
FIG. 11 is a section view showing the sub-scan direction of the optical system of the first embodiment.

FIGS. 10 and 11 show the construction of a first embodiment of the optical system of the image reading apparatus of the present invention. FIG. 10 is a section view of the main scan direction, and FIG. 11 is a section view of the sub-scan direction viewed from the side of FIG. 10.

In FIGS. 10 and 11, item 18 is a light source such as a xenon lamp and the like, item 19 is a reflecting shade, item 11 is a cylindrical light guide formed of an optically homogeneous material such as synthetic quartz having a refractive index of about 1.4, optical glass (e.g., BK7) having a refractive index of about 1.52, optical plastic having a refractive index of about 1.5 and the like. Item 12 is a light-shielding member, item 13 is a slit having an aperture along the axial direction of the light guide 11, item 14 is a light-diffusing band formed in the axial direction along the exterior side of the light guide 11, said light-diffusing band being formed by coating the side opposite the slit 13 with a material having a fine particle dispersion, for example, titanium oxide, zinc oxide and the like contained in a silicone rubber. Item 15 is a film holder constructed of a transparent material such as glass and the like, and is used to grip both surfaces of the film F upon which is formed an original image. Item 16 is a projection lens, item 17 is a line sensor comprising a linear array of CCD's, which read the image, converts the data to electrical signals, and outputs said electrical signals. The slit 13 and light-diffusing band 14 provided of the light guide 11 are constructed to fulfill the previously described dimensional conditions.

In the previously described construction, the light emitted by the light source 18 enters one end of the light guide 11 and advances to the other end thereof while being totally reflected within the light guide. At this time, the light enters the light-diffusing band 14 where it is diffused, and leaked out of the light guide 11 via the slit 13; the light guide 11 is formed as a linear light source. The image on the film F supported by the film holder 15 is illuminated by the light emitted through the slit 13 so as to form an image on the line sensor 17 via the projection lens 16. The line sensor 17 reads the formed image, and outputs image signals for each one-line segment in the main scan direction. Sub-scanning is accomplished by moving the film holder 15 in the sub-scan direction (arrow S direction), but the sub-scanning means is a conventional means and a description of said means is therefore omitted herefrom.

Figure 12:
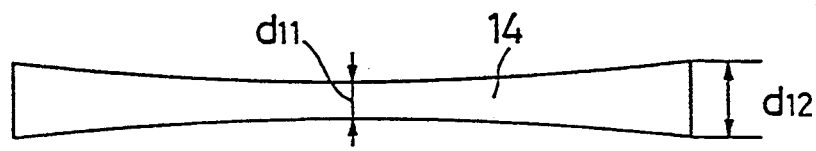
FIG. 12 is an elevation view of the light-diffusing portion of a second embodiment.
Figure 13:
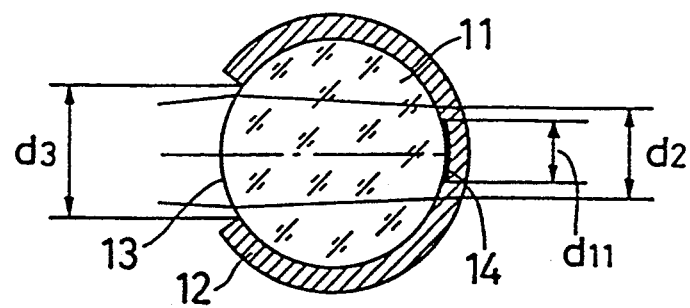
FIG. 13 shows the width of the light-diffusing band, width of the entering luminous flux, and width of the slit formed in the light guide of a second embodiment.
Figure 14:
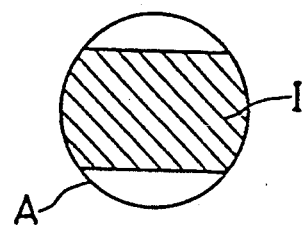
FIG. 14 shows the illumination area of the projection lens pupil of the second embodiment.
Figure 15:
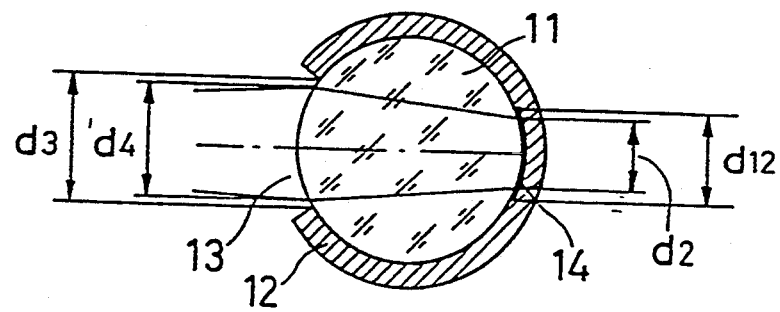
FIG. 15 shows the width of the light-diffusing band, width of the entering luminous flux, and width of the slit formed in the light guide of a second embodiment.
Figure 16:
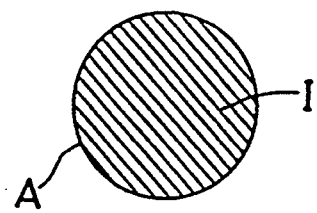
FIG. 16 shows the illumination area of the projection lens pupil of the second embodiment.

FIGS. 12 through 16 show the construction of a second embodiment of an optical system for the image reading apparatus of the present invention. The second embodiment improves aspects of the reduction of illumination near the periphery in the main scan direction and lack of broadening of the field angle of the projection lens due to projection lens characteristics (cosine$^4$ rule) since the light-diffusing band width of the first embodiment is uniform near the periphery and near the center in the main scan direction. FIG. 12 shows the configuration of the light-diffusing band 14. FIGS. 13 and 15 are section views of the light guide on the projection lens axis and outside the axis, respectively, which show the slit width, light-diffusing band width and incident luminous flux. FIGS. 14 and 16 show the illumination area I of the pupil A on the projection lens axis and outside the axis.

The second embodiment has a construction identical in basic respects to that of the first embodiment shown in FIGS. 10 and 11, but differs in the width d1 of the light-diffusing band 14 near the center and near the periphery in the main scan direction. As shown in FIG. 12, the light-diffusing band 14 has a width d12 outside the axis of the projection lens near the periphery in the main scan direction, said width d12 being wider than the width d11 on the axis of the projection lens.

According to the previously described construction, the width d11 of the light-diffusing band 14 is narrower than the luminous flux width d2 corresponding to the total pupil diameter of the projection lens on the projection lens axis, as shown in FIG. 13 (d11<d2). Therefore, the illumination area I of the projection lens pupil A is such that an eclipse is produced at one end and an opposite end of the illumination area I of the pupil A and the total area of the pupil cannot be illuminated. Outside the axis of the projection lens, the width d12 of the light-diffusing band 14 is broader than the luminous flux width d2 corresponding to the total pupil diameter of the projection lens (d3>d4, and d12>d2), as shown in FIG. 15. Therefore, the pupil illumination area is the total pupil area, as shown in FIG. 16. Thus, the reduction in illumination near the periphery in the main scan direction is corrected, thereby allowing uniform illumination of the total area in the main scan direction.

Figure 20:
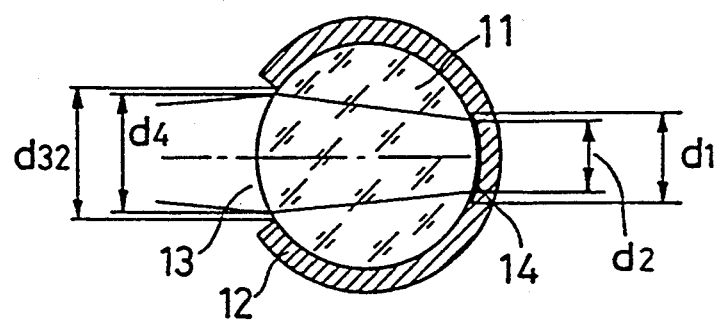
FIG. 20 shows the width of the light-diffusing band, width of the entering luminous flux, and width of the slit formed in the light guide of a third embodiment.
Figure 21:
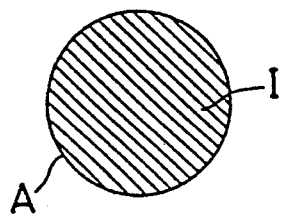
FIG. 21 shows the illumination area of the projection lens pupil of the third embodiment.

FIGS. 17 through 21 are illustrations showing the construction of a third embodiment of the optical system of the image reading apparatus of the present invention. The third embodiment improves aspects of the reduction of illumination near the periphery in the main scan direction and lack of broadening of the field angle of the projection lens due to projection lens characteristics (cosine$^4$ rule) since the slit width of the first embodiment is uniform near the periphery and near the center in the main scan direction. FIG. 17 shows the configuration of the slit 13. FIGS. 18 and 20 show are section views of the light guide on the projection lens axis and outside the axis, respectively, which show the slit width, light-diffusing band width and incident luminous flux. FIGS. 19 and 21 show the illumination area I of the pupil A on the projection lens axis and outside the axis.

The third embodiment has a construction identical in basic respects to that of the first embodiment shown in FIGS. 10 and 11, but differs in the width d3 of the slit 13 near the center and near the periphery in the main scan direction. As shown in FIG. 17, the slit 13 has a width d3 such that the width d32 outside the axis of the projection lens near the periphery in the main scan direction is broader than the width d31 on the axis of the projection lens.

According to the previously described construction, on the axis of the projection lens the luminous flux width d41 at the slit surface corresponding to the total pupil diameter of the projection lens is equal to the width d31 of the slit 13 and is narrower than the luminous flux width d4 corresponding to the total pupil diameter of the projection lens, as shown in FIG. 18 (d31=d41<d4 and d21<d1). Therefore, the illumination area I of the projection lens pupil A is such that an eclipse is produced at one end and an opposite end of the illumination area I of the pupil A, as shown in FIG. 19, and the total area of the pupil cannot be illuminated. The width d21 is the width on the light-diffusing band 14 receiving illumination. Outside the axis of the projection lens, the width d32 of the slit 13 is broader than the luminous flux width d4 corresponding to the total pupil diameter of the projection lens (d32>d4, and d1>d2), as shown in FIG. 20. Therefore, the pupil A illumination area I is the total pupil area, as shown in FIG. 21. Thus, the reduction in illumination near the periphery in the main scan direction is corrected, thereby allowing uniform illumination of the total area in the main scan direction.

Figure 22:
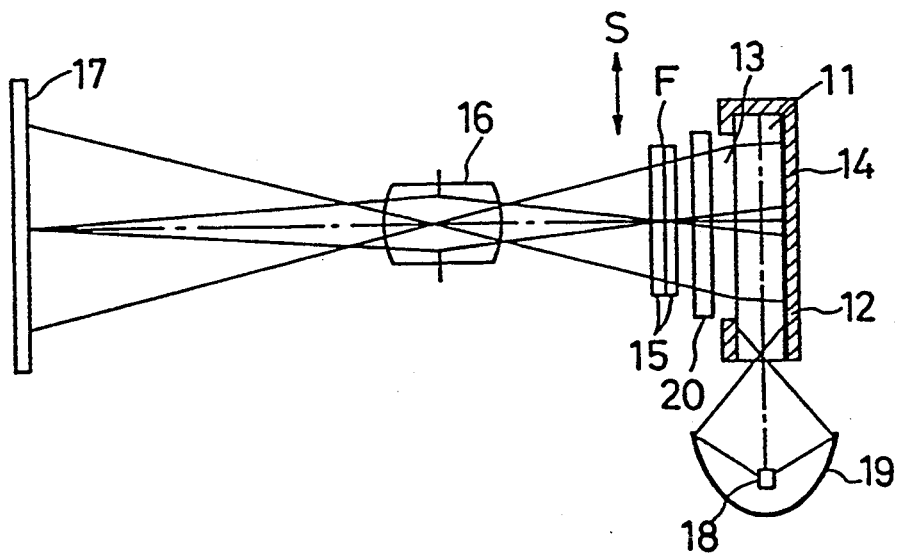
FIG. 22 is a section view showing the main scan direction of the optical system of a fourth embodiment.
Figure 23:
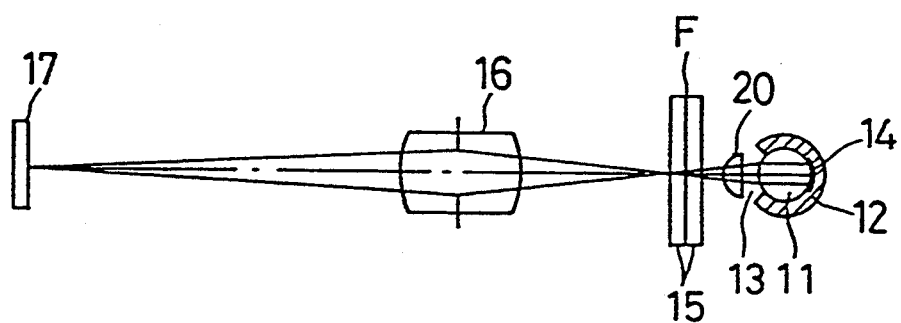
FIG. 23 is a section view showing the sub-scan direction of the optical system of the fourth embodiment.
Figure 24:
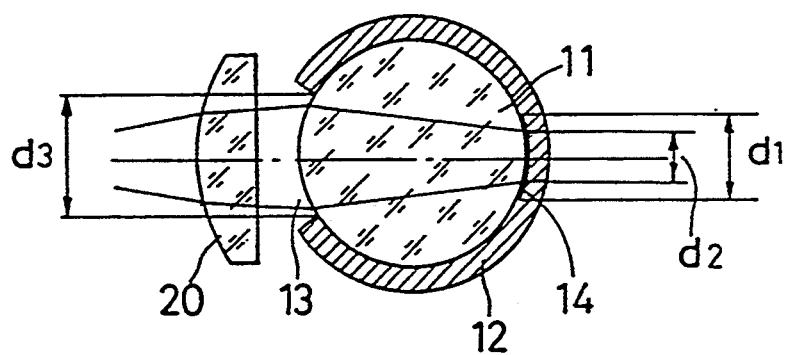
FIG. 24 shows the width of the light-diffusing band, width of the entering luminous flux, and width of the slit formed in the light guide of a fourth embodiment.
Figure 25:
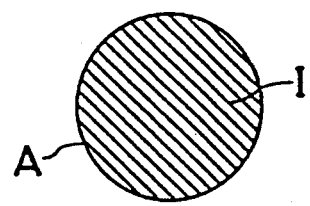
FIG. 25 shows the illumination area of the projection lens pupil of the fourth embodiment.

FIGS. 22 through 25 are illustrations showing the construction of a fourth embodiment of the optical system of the image reading apparatus of the present invention. The fourth embodiment improves aspects of the reduction of luminance or reduction in the amount of light due to the production of an eclipse on the pupil when the width of the light-diffusing band is made broader to illuminate the total area of the pupil of the projection lens in the first through third embodiments. FIG. 22 is s section view in the main scan direction, and FIG. 23 is a section view in the sub-scan direction viewed from the side of FIG. 22. FIG. 24 is a section view of the light guide showing the slit width, light-diffusing band width and incident luminous flux. FIG. 25 shows the illumination area I of the pupil A of the projection lens.

The fourth embodiment has a construction which provides a cylindrical lens 20 arranged intermedially between the light guide 11 and the film holder 15 in proximity to the light guide 11 in the first embodiment shown in FIGS. 10 and 11. Accordingly, parts of the present embodiment having similar construction and common to the first embodiment shown in FIGS. 10 and 11 are designated by like reference numbers. That is, item 18 is a light source such as a xenon lamp and the like, item 19 is a reflecting shade, item 11 is a cylindrical light guide, item 13 is a slit having an aperture along the axial direction of the light guide 11, item 14 is a light-diffusing band formed in the axial direction along the exterior side of the light guide 11, item 20 is a convex cylindrical lens arranged along the axial direction of the light guide 11 and having dimensions such that the width of the aforesaid slit is covered thereby. Item 15 is a film holder used to grip both surfaces of the film F upon which is formed an original image. Item 16 is a projection lens, and item 17 is a line sensor comprising a linear array of CCD's.

The slit 13 and the light-diffusing band 14 provided on the light-diffusing band 14 are constructed so as to fulfill the dimensional conditions described by the previously mentioned several equations.

When viewing the aforesaid construction from the one-dimensional line sensor, the luminous flux corresponding to the total pupil of the projection lens is condensed by the cylindrical lens 20, condensed by the light guide 11, and enters the light-diffusing band 14, as clearly shown in FIG. 24, so that the total area of the pupil of said projection lens can be illuminated, as shown in FIG. 25. The width of the incident luminous flux may be narrowed and the width of the light-diffusing band 14 may be narrowed so as to improve the luminance of the reflected light emitted when reflected by the light-diffusing band 14.

As previously described, the present invention provides an image reading apparatus having a highly efficient linear illumination system. More specifically, the illumination system is capable of illuminating the total area of the pupil of the projection lens by determining the width of the slit portion and the width of the light-diffusing portion in accordance with predetermined conditions, and therefore is capable of providing excellent illumination of an original image. Furthermore, even when there is a differential in the illumination at the center portion and peripheral portions in the main scan direction, the characteristics of the projection lens are such as to allow correction of said differences by changing the width of the light-diffusing portion and the width of the slit portion so as to achieve uniform illumination of the entire scanning area. When a convex cylindrical lens is arranged intermedially between the illumination system and the original supporting member, the width of the light-diffusing portion may be narrowed so as to improve luminance of the emitted reflected light.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus comprising:
   a light guide formed of a cylindrically shaped light-transmitting material;
   a light source for introducing light into said light guide from one end thereof in the lengthwise direction of said light guide;
   a light-diffusing member formed on the circumference of said light guide in the lengthwise direction of said light guide;
   a slit member positioned opposite said light-diffusing member;
   an original supporting member for supporting a light-transmitting type original at a position illuminated by the luminous flux of rays emitted from said slit member, said original supporting member and said light guide being relatively movable;
   a projection lens for projecting the illuminated original image; and
   a line sensor formed in a linear shape for optically reading the projected image and outputting the read image data as electrical signals thereafter,
   wherein said light-diffusing member is constructed so as to fulfill the condition described below:

$$d1 > -2 \tan \beta (1 + \cos \alpha 1) r + d4$$

where $\beta = (\alpha 1 - \alpha 2)$ $\alpha 1 = \sin (d4/2r)$ $\alpha 2 = \sin (\sin (\theta + \alpha 1)/n)$ d1: width of light-diffusing member d4: width of luminous flux entering the slit member when rays are traced from the protection lens pupil $\theta$ = angle at which luminous flux entering the slit portion meets the optical axis when rays are traced from the projection lens pupil r = radius of light guide n = refractive index of light guide medium.

2. An image forming apparatus as claimed in claim 1, wherein said light-diffusing member and said slit member are constructed so as to illuminate an entire area of said projection lens pupil.

3. An image forming apparatus as claimed in claim 1, wherein said light-diffusing member is constructed such that a width of the center portion and a width of the end portions differ from each other in a lengthwise direction.

4. An image forming apparatus as claimed in claim 1, wherein said slit member is constructed such that a width of the center portion and a width of the end portions differ from each other in a lengthwise direction.

5. An image forming apparatus as claimed in claim 1 further comprising a convex cylinder lens positioned between the light guide and the original supporting member.

6. An image reading apparatus comprising:

a light guide formed of a cylindrically shaped light-transmitting material;

a light source for introducing light into said light guide from one end thereof in the lengthwise direction of said light guide;

a light-diffusing member formed on the circumference of Said light guide in the lengthwise direction of said light guide;

a slit member positioned opposite said light-diffusing member;

an original supporting member for supporting a light-transmitting type original at a position illuminated by the luminous flux of rays emitted from said slit member;

a projection lens facing the light guide across the original supporting member for projecting the illuminated original image; and a sensor for optically reading the projected image and outputting the read image data as electrical signals, wherein said light-diffusing member is constructed so as to fulfill the condition described below:

$$d1 > -2 \tan \beta (1 + \cos \alpha 1) r + d4$$

where $\beta = (\alpha 1 - \alpha 2)$ $\alpha 1 = \sin (d4/2r)$ $\alpha 2 = \sin (\sin (\theta + \alpha 1)/n)$ d1: width of light-diffusing member d4: width of luminous flux entering the slit member when rays are traced from the projection lens pupil $\theta$ = angle at which luminous flux entering the slit portion meets the optical axis when rays are traced from the projection lens pupil r = radius of light guide n = refractive index of light guide medium.

7. An image reading apparatus as claimed in claim 6 wherein said light source is covered with a reflecting shade.

8. An image reading apparatus as claimed in claim 6 wherein said light guide is provided with a light-shielding member.

9. An image reading apparatus as claimed in claim 6 wherein said light-diffusing member is formed of a silicone rubber containing a titanium oxide or zinc oxide.

* * * * *

UNITED STATES PATENT AND TRADEMARK OFFICE
CERTIFICATE OF CORRECTION

PATENT NO. : 5,416,608
DATED : May 16, 1995
INVENTOR(S) : Toshihiko Ueda, et al.

It is certified that error appears in the above-indentified patent and that said Letters Patent is hereby corrected as shown below:

In col. 4, line 44, change "8" to -- $\theta$ --.

In col. 4, line 47, change "$\alpha 2=\sin^{-1}(d4/2r)$" to -- $\alpha 1=\sin^{-1}(d4/2r)$ --.

In col. 10, line 2 (Claim 6, line 8), change "Said" to -- said --.

Signed and Sealed this

Twenty-ninth Day of August, 1995

Attest:

BRUCE LEHMAN

*Attesting Officer*      *Commissioner of Patents and Trademarks*